(12) United States Patent
Azima et al.

(10) Patent No.: US 6,327,369 B1
(45) Date of Patent: *Dec. 4, 2001

(54) LOUDSPEAKERS COMPRISING PANEL-FORM ACOUSTIC RADIATING ELEMENTS

(75) Inventors: Henry Azima, Cambridge; Martin Colloms, London; Neil Harris, Great Shelford, all of (GB)

(73) Assignee: New Transducers Limited, London (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/029,340
(22) PCT Filed: Sep. 2, 1996
(86) PCT No.: PCT/GB96/02140
§ 371 Date: May 13, 1998
§ 102(e) Date: May 13, 1998
(87) PCT Pub. No.: WO97/09840
PCT Pub. Date: Mar. 13, 1997

Related U.S. Application Data

(63) Continuation-in-part of application No. 08/707,012, filed on Sep. 3, 1996.

(30) Foreign Application Priority Data

Sep. 2, 1995 (GB) .................................................. 9517918
Oct. 31, 1995 (GB) .................................................. 9522281
Mar. 30, 1996 (GB) .................................................. 9606836

(51) Int. Cl.[7] .................................................. H04R 25/00
(52) U.S. Cl. ........................... 381/152; 381/431; 381/425
(58) Field of Search ............................. 381/87, 333, 332, 381/152, 345, 190, 396, 431, FOR 146, 182, 186, 191, 349, 398, 337; 181/150

(56) References Cited

U.S. PATENT DOCUMENTS

| | | |
|---|---|---|
| 1,773,910 | 8/1930 | Lane . |
| 3,347,335 * | 10/1967 | Watters et al. ........................ 381/337 |
| 5,025,474 * | 6/1991 | Tanaka et al. ........................ 381/186 |
| 5,400,407 * | 3/1995 | Cassity et al. ........................ 381/87 |

FOREIGN PATENT DOCUMENTS

| | | |
|---|---|---|
| 37 30 305 C 1 | 3/1989 | (DE) . |
| 2010637 * | 6/1979 | (GB) . |
| 2 219 712 A | 12/1989 | (GB) . |
| WO 92/03024 * | 2/1992 | (GB) . |

* cited by examiner

Primary Examiner—Huyen Le
(74) Attorney, Agent, or Firm—Foley & Lardner

(57) ABSTRACT

A panel-form loudspeaker (81) comprising a resonant distributed mode acoustic radiator (2), and drive means (9) mounted to the radiator to excite multi-mode resonance in the radiator, characterised by a baffle (6, 8) surrounding and supporting the radiator.

10 Claims, 5 Drawing Sheets

LOUDSPEAKERS COMPRISING PANEL-FORM ACOUSTIC RADIATING ELEMENTS

This application is a continuation-in-part of application Ser. No. 08/707,012, filed Sep. 3, 1996.

TECHNICAL FIELD

The invention relates to loudspeakers and more particularly to loudspeakers comprising panel-form acoustic radiating elements.

BACKGROUND ART

It is known from GB-A-2262861 to suggest a panel-form loudspeaker comprising:
- a resonant multi-mode radiator element being a unitary sandwich panel formed of two skins of material with a spacing core of transverse cellular construction, wherein the panel is such as to have ratio of bending stiffness (B), in all orientations, to the cube power of panel mass per unit surface area ($\mu$) of at least 10;
- a mounting means which supports the panel or attaches to it a supporting body, in a free undamped manner;
- and an electro-mechanical drive means coupled to the panel which serves to excite a multi-modal resonance in the radiator panel in response to an electrical input within a working frequency band for the loudspeaker.

U.S. Pat. No. 3,247,925 of WARNAKA discloses what purports to be a low frequency resonant panel loudspeaker mounted in a chassis and excited by an electromechanical transducer mounted on the chassis.

DISCLOSURE OF INVENTION

Embodiments of the present invention use members of nature, structure and configuration achievable generally and/or specifically by implementing teachings of our co-pending application Ser. No. 08/707,012. Such members thus have capability to sustain and propagate input vibrational energy by bending waves in operative area(s) extending transversely of thickness often but not necessarily to edges of the member(s); are configured with or without anisotropy of bending stiffness to have resonant mode vibration components distributed over said area(s) beneficially for acoustic coupling with ambient air; and have predetermined preferential locations or sites within said area for transducer means, particularly operationally active or moving part(s) thereof effective in relation to acoustic vibrational activity in said area(s) and signals, usually electrical, corresponding to acoustic content of such vibrational activity. Uses are envisaged in co-pending application Ser. No. 08/707,012 for such members as or in "passive" acoustic devices without transducer means, such as for reverberation or for acoustic filtering or for acoustically "voicing" a space or room; and as or in "active" acoustic devices with transducer means, such as in a remarkably wide range of sources of sound or loudspeakers when supplied with input signals to be converted to said sound, or in such as microphones when exposed to sound to be converted into other signals.

This invention is particularly concerned with active acoustic devices in the form of loudspeakers. Members as above are herein called distributed mode acoustic radiators and are intended to be characterised as in the above copending parent application and/or otherwise as specifically provided herein.

The invention is a panel-form loudspeaker characterised by a member having capability to sustain and propagate input vibrational energy by bending waves in at least one operative area extending transversely of thickness to have resonant mode vibration components distributed over said at least one area and have predetermined preferential locations or sites within said area for vibration exciter means and having a vibration exciter mounted on said member at one of said locations or sites to vibrate the member to cause it to resonate forming an acoustic radiator which provides an acoustic output when resonating, and a baffle surrounding and supporting the radiator. A resilient suspension may be provided between the radiator and the baffle to support the radiator in the baffle. The resilient suspension may be of an elastomeric material. The vibration exciter may be mounted wholly and exclusively on the radiator. The baffle may be formed as an enclosure having an open backed front box portion adapted to be mounted on a wall or the like. The front box portion may be adapted to be mounted to align with a cavity in the wall. The radiator may comprise a lightweight core separating a pair of high modulus lightweight skins. A subwoofer may be mounted to the baffle. A tweeter may be mounted to the baffle.

BRIEF DESCRIPTION OF DRAWINGS

The invention is diagrammatically illustrated, by way of example, in the accompanying drawings, in which:

FIG. 4b is a partial cross-sectional view of the loudspeaker of FIG. 4a;

FIG. 5b is a partial cross-sectional view of the loudspeaker of FIG. 5a.

BEST MODES FOR CARRYING OUT THE INVENTION

Figure 1:
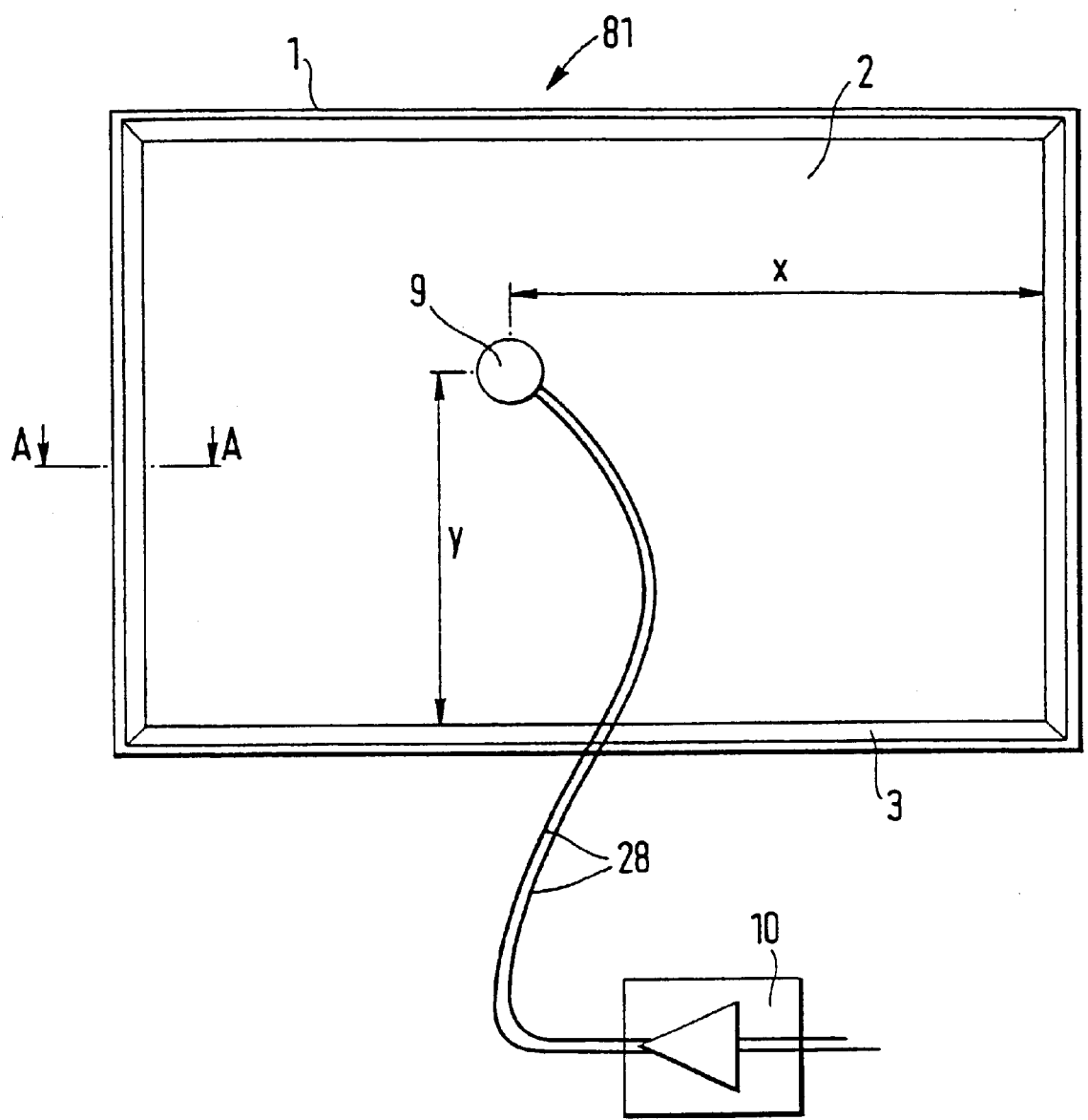
FIG. 1 is a diagram showing a distributed-mode member as described and claimed in our co-pending application Ser. No. 08/707,012.

Referring to FIG. 1 of the drawings, there is shown a panel-form loudspeaker (81) of the kind described and claimed in our co-pending application Ser. No. 08/707,012 comprising a rectangular frame (1) carrying a resilient suspension (3) round its inner periphery which supports a distributed mode sound radiating panel (2). A transducer (9) e.g as described in detail with application Ser. Nos. 09/011,773, 09/011,770, and 09/011,831 is mounted wholly and exclusively on or in the panel (2) at a predetermined location defined by dimensions x and y, the position of which location is calculated as described in our co-pending application Ser. No. 08/707,012 to launch bending waves into the panel to cause the panel to resonate to radiate an acoustic output.

The transducer (9) is driven by a signal amplifier (10), e.g. an audio amplifier, connected to the transducer by conductors (28). Amplifier loading and power requirements can be entirely normal, similar to conventional cone type speakers, sensitivity being of the order of 86–88 dB/watt under room loaded conditions. Amplifier load impedance is largely resistive at 6 ohms, power handling 20–80 watts. Where the panel core and/or skins are of metal, they may be made to act as a heat sink for the transducer to remove heat from the motor coil of the transducer and thus improve power handling.

Figure 2A:
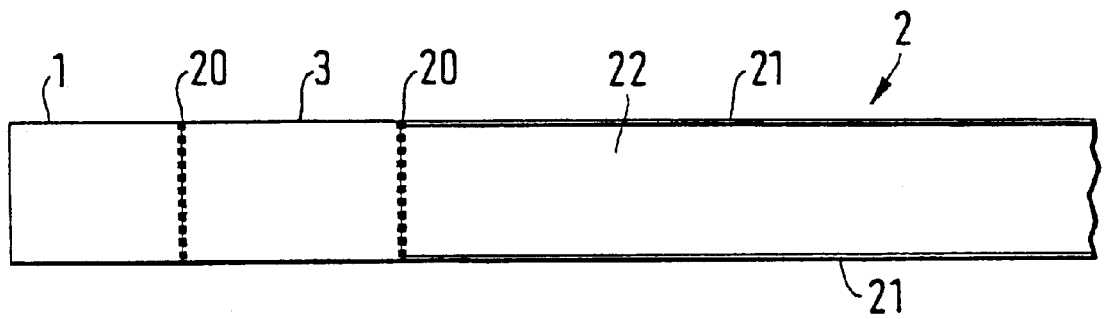
FIG. 2a is a partial section on the line A—A of FIG. 1.
Figure 2B:
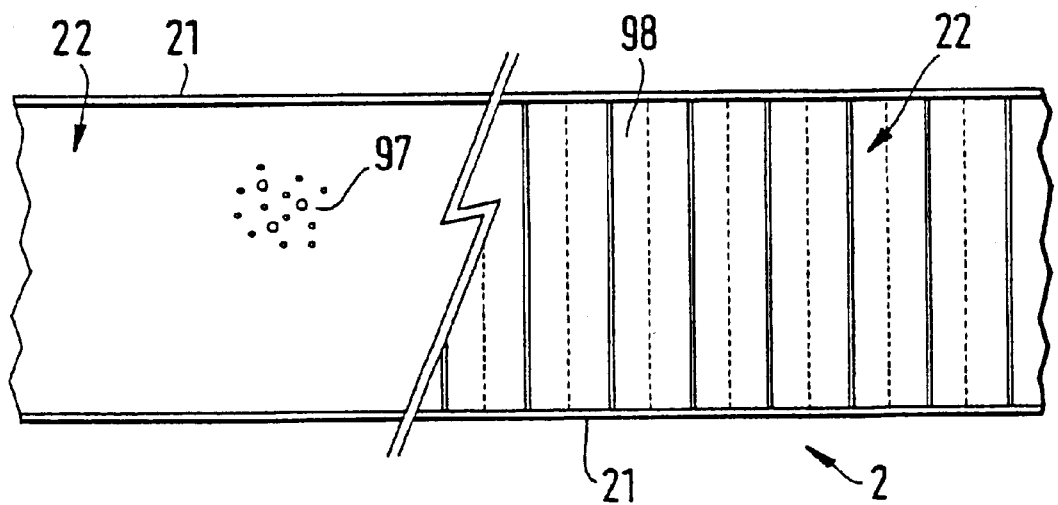
FIG. 2b is an enlarged cross-section through a distributed mode radiator of the kind shown in FIG. 2a and showing two alternative constructions.

FIGS. 2a and 2b are partial typical cross-sections through the loudspeaker (81) of FIG. 1. FIG. 2a shows that the frame (1), surround (3) and panel (2) are connected together by respective adhesive-bonded joints (20). Suitable materials for the frame include lightweight framing, e.g. picture framing of extruded metal e.g. aluminium alloy or plastics. Suitable surround materials include resilient materials such as foam rubber and foam plastics. Suitable adhesives for the joints (20) include epoxy, acrylic and cyano-acrylate etc. adhesives.

FIG. 2b illustrates, to an enlarged scale, that the panel (2) is a rigid lightweight panel having a core (22) e.g. of a rigid plastics foam (97) e.g. cross linked polyvinylchloride or a cellular matrix (98) i.e. a honeycomb matrix of metal foil, plastics or the like, with the cells extending transversely to the plane of the panel, and enclosed by opposed skins (21) e.g. of paper, card, plastics or metal foil or sheet. Where the skins are of plastics, they may be reinforced with fibres e.g. of carbon, glass, Kevlar (RTM) or the like in a manner known per se to increase their modulus.

Envisaged skin layer materials and reinforcements thus include carbon, glass, Kevlar (RTM), Nomex (RTM) i.e. aramid etc. fibres in various lays and weaves, as well as paper, bonded paper laminates, melamine, and various synthetic plastics films of high modulus, such as Mylar (RTM), Kaptan (RTM), polycarbonate, phenolic, polyester or related plastics, and fibre reinforced plastics, etc. and metal sheet or foil. Investigation of the Vectra grade of liquid crystal polymer thermoplastics shows that they may be useful for the injection moulding of ultra thin skins or shells of smaller size, say up to around 30 cm diameter. This material self forms an orientated crystal structure in the direction of injection, a preferred orientation for the good propagation of treble energy from the driving point to the panel perimeter.

Additional such moulding for this and other thermoplastics allows for the mould tooling to carry location and registration features such as grooves or rings for the accurate location of transducer parts e.g. the motor coil, and the magnet suspension. Additionally with some weaker core materials it is calculated that it would be advantageous to increase the skin thickness locally e.g. in an area or annulus up to 150% of the transducer diameter, to reinforce that area and beneficially couple vibration energy into the panel. High frequency response will be improved with the softer foam materials by this means.

Envisaged core layer materials include fabricated honeycombs or corrugations of aluminium alloy sheet or foil, or Kevlar (RTM), Nomex (RTM), plain or bonded papers, and various synthetic plastics films, as well as expanded or foamed plastics or pulp materials, even aerogel metals if of suitably low density. Some suitable core layer materials effectively exhibit usable self-skinning in their manufacture and/or otherwise have enough inherent stiffness for use without lamination between skin layers. A high performance cellular core material is known under the trade name 'Rohacell' which may be suitable as a radiator panel and which is without skins. In practical terms, the aim is for an overall lightness and stiffness suited to a particular purpose, specifically including optimising contributions from core and skin layers and transitions between them.

Several of the preferred formulations for the panel employ metal and metal alloy skins, or alternatively a carbon fibre reinforcement. Both of these, and also designs with an alloy Aerogel or metal honeycomb core, will have substantial radio frequency screening properties which should be important in several EMC applications. Conventional panel or cone type speakers have no inherent EMC screening capability.

In addition the preferred form of piezo and electro dynamic transducers have negligible electromagnetic radiation or stray magnetic fields. Conventional speakers have a large magnetic field, up to 1 meter distant unless specific compensation counter measures are taken.

Where it is important to maintain the screening in an application, electrical connection can be made to the conductive parts of an appropriate DML panel or an electrically conductive foam or similar interface may be used for the edge mounting.

The suspension (3) may damp the edges of the panel (2) to prevent excessive edge movement of the panel. Additionally or alternatively, further damping may be applied, e.g. as patches, bonded to the panel in selected positions to damp excessive movement to distribute resonance equally over the panel. The patches may be of bitumen-based material, as commonly used in conventional loudspeaker enclosures or may be of a resilient or rigid polymeric sheet material. Some materials, notably paper and card, and some cores may be self-damping. Where desired, the damping may be increased in the construction of the panels by employing resiliently setting, rather than rigid setting adhesives.

Effective said selective damping includes specific application to the panel including its sheet material of means permanently associated therewith. Edges and corners can be particularly significant for dominant and less dispersed low frequency vibration modes of panels hereof. Edge-wise fixing of damping means can usefully lead to a panel with its said sheet material fully framed, though their corners can often be relatively free, say for desired extension to lower frequency operation. Attachment can be by adhesive or self-adhesive materials. Other forms of useful damping, particularly in terms of more subtle effects and/or mid- and higher frequencies can be by way of suitable mass or masses affixed to the sheet material at predetermined effective medial localised positions of said area.

An acoustic panel as described above is bi-directional. The sound energy from the back is not strongly phase related to that from the front. Consequently there is the benefit of overall summation of acoustic power in the room, sound energy of uniform frequency distribution, reduced reflective and standing wave effects and with the advantage of superior reproduction of the natural space and ambience in the reproduced sound recordings.

While the radiation from the acoustic panel is largely non-directional, the percentage of phase related information increases off axis. For improved focus for the phantom stereo image, placement of the speakers, like pictures, at the usual standing person height, confers the benefit of a moderate off-axis placement for the normally seated listener optimising the stereo effect. Likewise the triangular left/right geometry with respect to the listener provides a further angular component. Good stereo is thus obtainable.

There is a further advantage for a group of listeners compared with conventional speaker reproduction. The intrinsically dispersed nature of acoustic panel sound radiation gives it a sound volume which does not obey the inverse square law for distance for an equivalent point source. Because the intensity fall-off with distance is much less than predicted by inverse square law then consequently for off-centre and poorly placed listeners the intensity field for the panel speaker promotes a superior stereo effect compared to conventional speakers. This is because the off-centre placed listener does not suffer the doubled problem due to proximity to the nearer speaker; firstly the excessive increase in loudness from the nearer speaker, and then the corresponding decrease in loudness from the further loudspeaker.

There is also the advantage of a flat, lightweight panel-form speaker, visually attractive, of good sound quality and requiring only one transducer and no crossover for a full range sound from each panel diaphragm.

Figure 3:
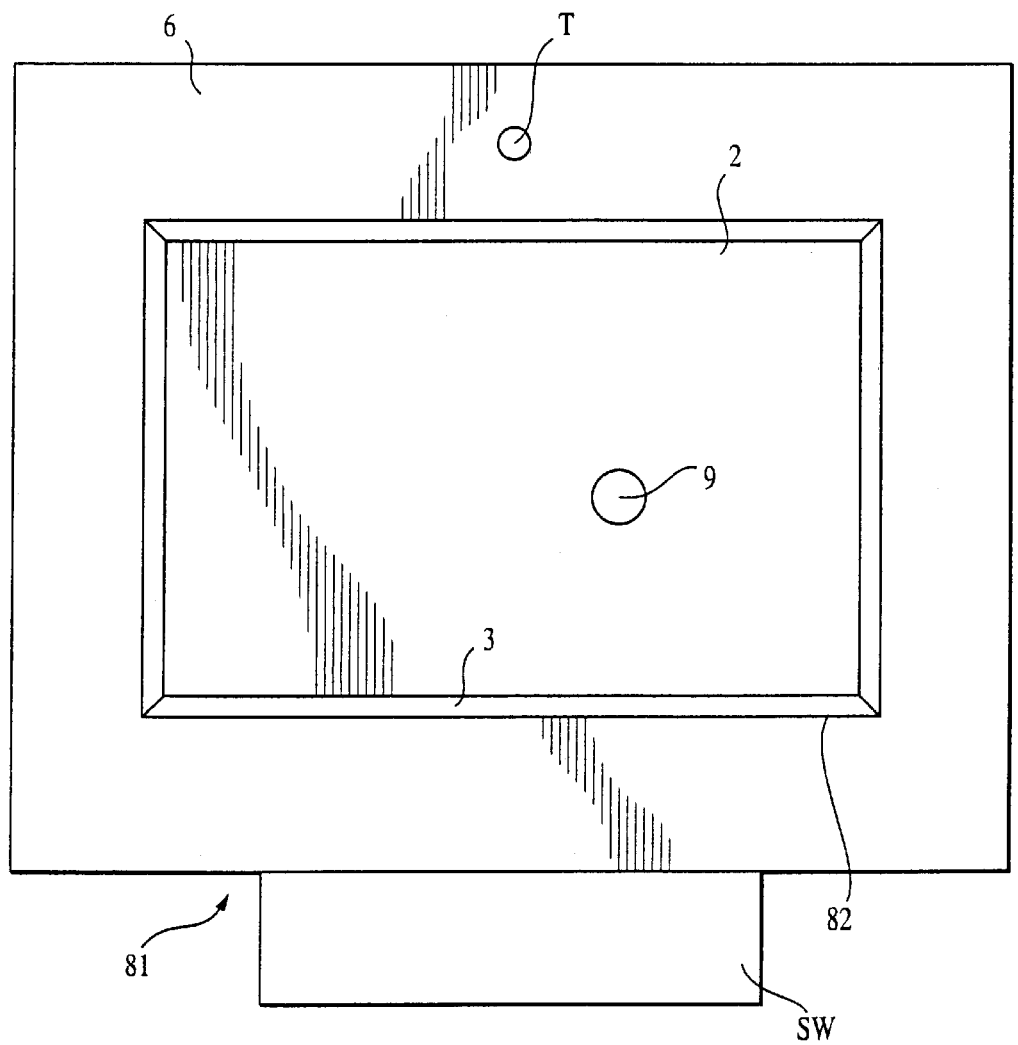
FIG. 3 is a diagram of a first embodiment of distributed-mode loudspeaker according to the present invention.

FIG. 3 illustrates a first embodiment of distributed mode panel-form loudspeaker (81) generally of the kind shown in FIGS. 1 and 2 and in which the frame (1) is replaced by a baffle-board (6), e.g. of medium density fibreboard, having a rectangular aperture (82) in which a distributed mode radiator panel (2) is mounted with the interposition of a resilient suspension (3). A transducer (9) of the kind described in our co-pending application Ser. Nos. 09/011,773, 09/011,770, and 09/011,831 is mounted wholly and exclusively on the panel (2) to vibrate the panel to cause it to resonate to produce an acoustic output.

Such a baffle may have the effect of augmenting lower frequency response of the loudspeaker. A subwoofer (SW) may be mounted to the baffle-board (6). A tweeter (T) also may be mounted to the baffle-board (6).

Figure 4A:
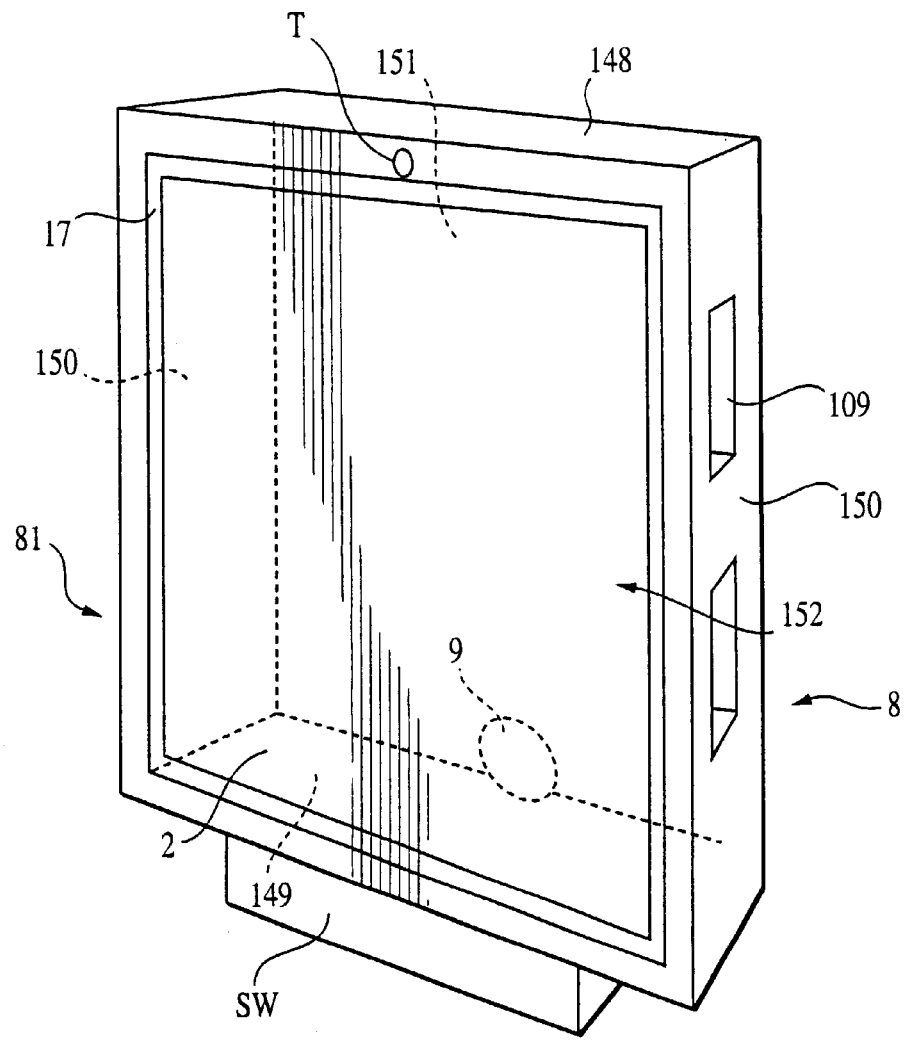
FIG. 4a is a perspective view of a second embodiment of distributed-mode loudspeaker according to the present invention.
Figure 4B:
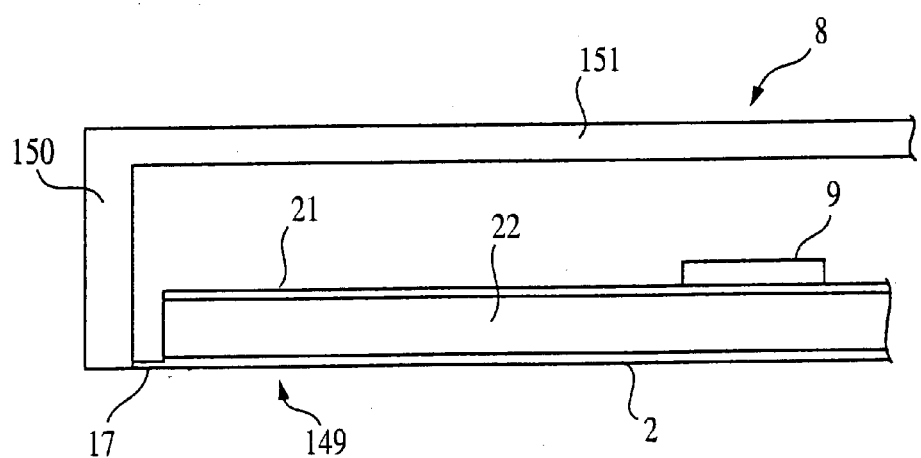

FIG. 4 illustrates a second embodiment of loudspeaker (81) according to the present invention. The loudspeaker comprises a box-like enclosure (8) having a top (148), a bottom (149), opposed sides (150), a back (151) and a front (152). The front (152) of the enclosure (8) consists of a rigid lightweight distributed mode radiator panel (2) of the kind described with reference to FIGS. 1 and 2 and comprising a core (22) enclosed by opposed skins (21). The panel (2) is supported in the enclosure (8) by means of a surrounding compliant suspension (17), e.g. a strip of latex rubber. An acoustic absorbing lining may be provided in the enclosure.

A transducer (9) e,g, of the kinds shown in our co-pending application Ser. Nos. 09/011,773, 09/011,770, and 09/011,831 is mounted wholly and exclusively on the inwardly directed face of the panel (2) in a predetermined location as discussed in our co-pending application Ser. No. 08/707,012 to vibrate the panel to cause it to resonate to produce an acoustic output.

The enclosure (8) may be formed with ports (109) e.g. in one side (150), to enhance bass performance of the loudspeaker. In any event, the use of the enclosure (8) will render the loudspeaker uni-directional, which may be desirable in some circumstances. A subwoofer (SW) may be mounted to the enclosure (8). A tweeter (T) also may be mounted to the enclosure (8).

Figure 5A:
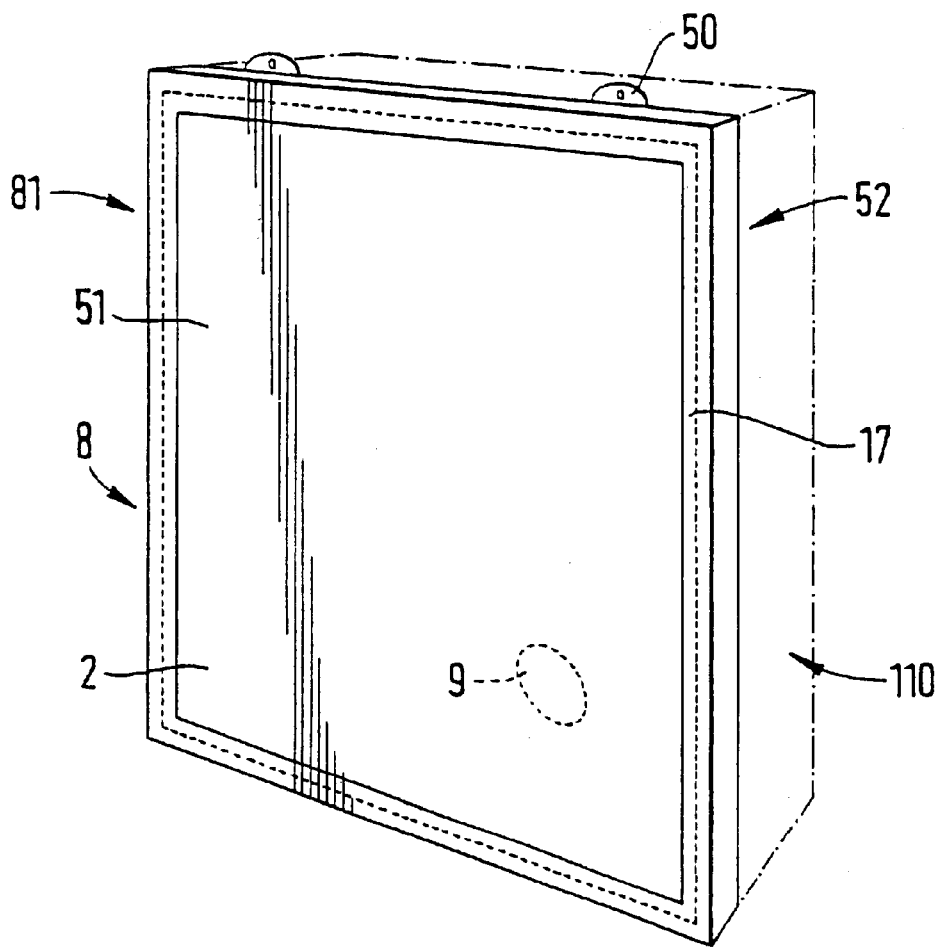
FIG. 5a is a perspective view of a third embodiment of distributed-mode loudspeaker according to the present invention.
Figure 5B:
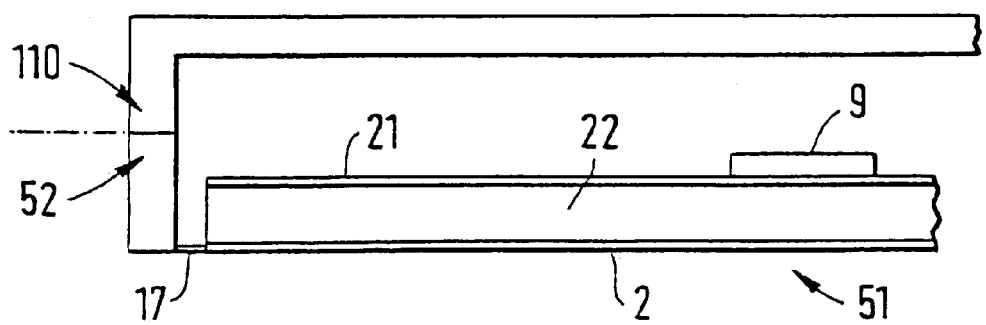

FIG. 5 illustrates a further embodiment of loudspeaker (81) according to the present invention and generally similar to that described above with reference to FIG. 4. The loudspeaker comprises a box-like enclosure (8) consisting of a front box portion (52) having an open back adapted to be mounted on a wall and aligned with a cavity (110) in the wall, e.g. in a stud-work wall, to reduce the depth of the loudspeaker enclosure while providing the benefits of a larger enclosure. The front face (51) of the front-box consists of a rigid lightweight distributed mode radiator (2) comprising a core (22) enclosed by opposed skins (21). The panel (2) is supported in the enclosure (8) by means of a surrounding resilient suspension (17), e.g. of rubber latex strip. The loudspeaker is thus generally of the kind described with reference to FIGS. 1 and 2 above.

A transducer (9), e.g. of the kind described with reference to our co-pending application Ser. Nos. 09/011,773, 09/011,770, and 09/011,831 mounted wholly and exclusively on the inwardly directed face of the panel (2) in a predetermined location as discussed in our co-pending application Ser. No. 08/707,012 to vibrate the panel to cause it to resonate to produce an acoustic output.

INDUSTRIAL APPLICABILITY

The loudspeakers of the present invention are relatively simple to make and can be made to have a relatively shallow depth, or apparently shallow depth, in comparison to conventional loudspeakers. The loudspeakers of the present invention have a wide angle of dispersion in comparison to conventional pistonic loudspeakers. Where the radiator panel is made from or is skinned with metal foil or sheet, the loudspeaker can be made to be shielded against radio-frequency emissions.

What is claimed is:

1. A panel-form loudspeaker comprising:

a member having selected values of certain physical parameters which enable the member to sustain and propagate input vibrational energy in a predetermined frequency range by a plurality of resonant bending wave modes in at least one operative area extending transversely of thickness such that the frequencies of the resonant bending wave modes along at least two conceptual axes of the operative area are interleaved and spread so that there are substantially minimal clusterings and disparities of spacings of said frequencies, the member when resonating having at least one site at which the number of vibrationally active resonance anti-nodes is relatively high;

at least one transducer coupled to the member at one of said sites on the member, the transducer being capable of vibrating the member in the predetermined frequency range to couple to and excite the resonant bending wave modes in the member and cause the member to resonate and produce an acoustic output; and a baffle surrounding and supporting the member.

2. A panel-form loudspeaker according to claim 1, further comprising a resilient suspension (3, 17) between the member (2) and the baffle (6, 8) to support the member in the baffle.

3. A panel-form loudspeaker according to claim 2, wherein the resilient suspension (3,17) is of an elastomeric material.

4. A panel-form loudspeaker according to claim 2, wherein the transducer is mounted wholly and exclusively on the member.

5. A panel-form loudspeaker according to, claim 1, wherein the transducer (9) is mounted wholly and exclusively on the member (2).

6. A panel-form loudspeaker according to claim 1 the baffle (8) is formed as an enclosure having an open backed front box portion (52) adapted to be mounted on a wall.

7. A panel-form loudspeaker according to claim 6, wherein the front box portion (52) is adapted to be mounted to align with a cavity (110) in the wall.

8. A panel-form loudspeaker according to claim 1, wherein the member (2) comprises a lightweight core (22) separating a pair of high modulus lightweight skins (21).

9. A panel-form loudspeaker according to claim 1 further comprising a subwoofer mounted to the baffle (6,8).

10. A panel-form loudspeaker according to claim 1 further comprising a tweeter mounted to the baffle (6,8).

* * * * *